(12) United States Patent
Garcia et al.

(10) Patent No.: US 7,087,656 B2
(45) Date of Patent: Aug. 8, 2006

(54) HIGH TEMPERATURE SICN AND SIC-TYPE NANOSTRUCTURED CERAMIC MATERIAL FROM BLOCK COPOLYMER MESOPHASES

(75) Inventors: Carlos Garcia, Albany, OR (US); Ulrich Wiesner, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 297 days.

(21) Appl. No.: 10/687,917

(22) Filed: Oct. 20, 2003

(65) Prior Publication Data

US 2005/0036931 A1    Feb. 17, 2005

Related U.S. Application Data

(60) Provisional application No. 60/494,096, filed on Aug. 12, 2003.

(51) Int. Cl.
*C04B 38/06* (2006.01)

(52) U.S. Cl. ............................ 521/63; 501/80; 501/81; 501/154; 528/24; 528/32; 528/38; 525/102

(58) Field of Classification Search ................ 521/63; 501/80, 81, 154; 528/24, 32, 38; 525/102
See application file for complete search history.

(56) References Cited

U.S. PATENT DOCUMENTS

| 5,853,886 A | 12/1998 | Pinnavaia et al. |
| 6,592,991 B1 * | 7/2003 | Wiesner et al. ............. 428/404 |
| 6,645,626 B1 | 11/2003 | Garcia et al. |
| 2004/0179969 A1 * | 9/2004 | Wan et al. .................... 419/13 |

FOREIGN PATENT DOCUMENTS

WO         99/12994     *   3/1999

\* cited by examiner

*Primary Examiner*—Margaret G. Moore
(74) *Attorney, Agent, or Firm*—Jones, Tullar&Cooper, P.C.

(57) ABSTRACT

A block copolymer, preferably a block copolymer such as poly(isoprene-block-ethylene oxide), PI-b-PEO, is used as a structure directing agent for a polymer derived ceramic (PDC) precursor, preferably a silazane, most preferably a silazane commercially known as Ceraset. The PDC precursor is preferably polymerized after mixing with the block copolymer to form a nanostructured composite material. Through further heating steps, the nanostructured composite material can be transformed into a nanostructured non-oxide ceramic material, preferably a high temperature SiCN or SiC material.

22 Claims, 2 Drawing Sheets

HIGH TEMPERATURE SICN AND SIC-TYPE NANOSTRUCTURED CERAMIC MATERIAL FROM BLOCK COPOLYMER MESOPHASES

CROSS-REFERENCE TO RELATED APPLICATION

This application claims the benefit, under 35 U.S.C. 119(e), of U.S. Provisional Application No. 60/494,096 filed Aug. 12, 2003, the contents of which are incorporated herein by reference.

BACKGROUND OF THE INVENTION

1. Field of the Invention

The present invention relates to a method for producing a nanostructured non-oxide ceramic material, preferably a high temperature SiCN and/or SiC material, using block copolymers as structure directing agents and polymer derived ceramic (PDC) precursors.

2. Description of Related Art

Despite some successes with methods ranging from colloidal templating to surfactant and block copolymer self-assembly, controlling the structure of ceramic materials at the nanometer length scale remains a challenge. Block copolymer self-assembly is particularly interesting due to the ability to form a variety of different mesophases in the bulk with periodicity in the tens of nanometer regime. As early as 1995, it was demonstrated that their self-assembly character can be employed to direct the structure of silica into mesoporous materials prepared from silicon alkoxides like tetraethylorthosilicate, TEOS. Before this discovery, the common way to produce nanostructures of ceramic materials was based on ionic surfactant systems with the Mobile Composition of Matter, MCM, type materials. Using block copolymers to generate structured silica had the advantage over surfactant based approaches to increase the accessible length scale of these structures by about an order of magnitude. Subsequent research on different block copolymer systems demonstrated the versatility of these materials to mesostructure a variety of different inorganic systems, albeit these were primarily metal oxide systems.

For many applications it is advantageous to move away from oxide structures towards high temperature stable and mechanically robust SiCN and SiC materials. Of particular interest are ceramic materials derived from polymer precursors, so called polymer derived ceramics (PDCs). A prototypical high temperature PDC oligomer/polymer precursor is a silazane commercially known as 'Ceraset'. Ceraset is a ureamethylvinylsilazane that can be further polymerized to form a polysilazane used in a variety of applications ranging from microelectromechanical devices (MEMS), coatings, and bulk SiCN ceramics. Recently the mechanical properties of bulk ceramics derived from this silazane were characterized. The SiCN ceramic prepared from Ceraset is an extremely stiff ceramic that when heated to temperatures greater than 1500° C. forms SiC with ~90% crystallinity.

BRIEF SUMMARY OF THE INVENTION

A nanostructured composite material is produced using a block copolymer, preferably poly(isoprene-block-ethylene oxide), PI-b-PEO, as a structure directing agent for a high temperature polymer derived ceramic (PDC) precursor, preferably a non-oxide ceramic precursor. The PDC precursor may be mixed with various block copolymers of different molecular weights and different block weight fractions. The preferred block copolymers have body-centered cubic (BBC) sphere, hexagonal cylinder, or lamellar morphologies. Regardless of which block copolymer is selected, the PDC precursor is miscible with only one phase of the block copolymer resulting in a nanostructured composite material. The process of the invention can also be used to prepare macroscopically oriented samples and mesoporous solids. The resulting nanostructured composite material has preferred applications in catalysis, such as fuel cells and fuel reformation, microelectromechanical systems (MEM), and filtration. However, the nanostructured composite material may be used in any application where a nanostructured high temperature ceramic material is desired.

In a preferred embodiment, wherein PI-b-PEO is the block copolymer, the PDC precursor is chemically compatible with the PEO microdomains of the block copolymer resulting in a swelling of those domains. After cooperative self-assembly of the block copolymer and the PDC precursor, the nanostructured composite material can be permanently set in the desired morphology, e.g., by polymerizing the PDC precursor. As a result, the use of block copolymers provides a simple, easily controlled pathway for the preparation of a nanostructured non-oxide ceramic materials, such as a high temperature SiCN or SiC material.

BRIEF DESCRIPTION OF THE DRAWING(S)

The features and advantages of the present invention will become apparent from the following detailed description of a preferred embodiment thereof, taken in conjunction with the accompanying drawings, in which.

DETAILED DESCRIPTION OF THE INVENTION

Figure 1:
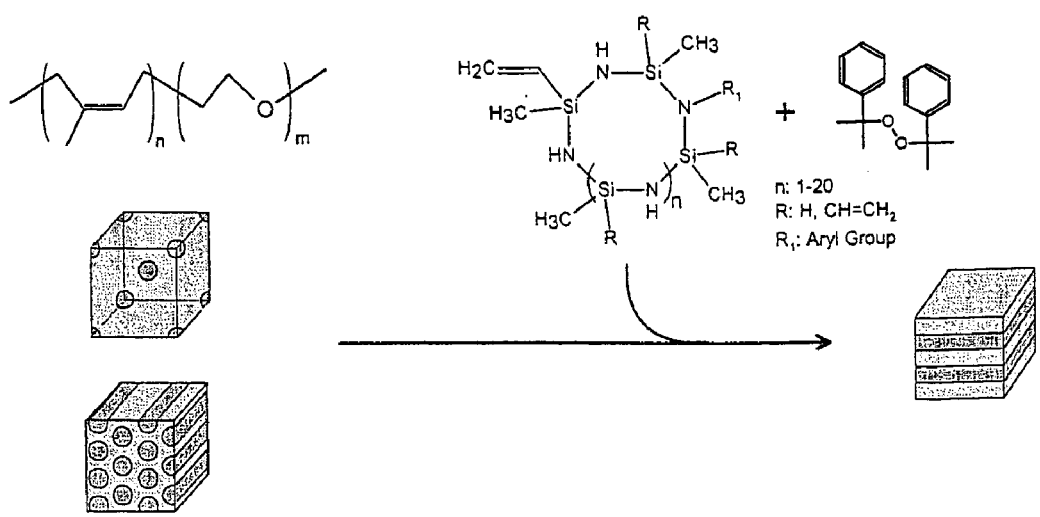
FIG. 1 is a synthesis schematic introducing the preferred compounds, PI-b-PEO, Ceraset, and dicumyl peroxide initiator, and showing the formation of nanostructured PI-b-PEO/polysilazane materials with lamellar morphology from two PI-b-PEO block copolymers with body-centered cubic and hexagonal morphologies, respectively, as structure directing agents for the Ceraset.

By selecting a block copolymer as a structure directing agent having one block chemically compatible with a polymer derived ceramic (PDC) precursor, a nanostructured composite material is accessible through a cooperative self-assembly of the PDC precursor and the block copolymer. The PDC precursor is preferably a silazane, most preferably a silazane commercially known as Ceraset, a ureamethylvinylsilazane. A nanostructured composite material exhibiting, e.g., a lamellar morphology is prepared by polymerizing the PDC precursor using radical initiation after mixing of the block copolymer and the PDC precursor. This method of cooperative self-assembly can be extended to a variety of different mesophases by either decreasing or increasing the fraction of PDC precursor added thus making nanostructured composite materials of different morphologies accessible. Furthermore, subsequent calcining of the nanostructured composite materials leads to nanostructured non-oxide ceramic materials in the form of nanoparticles of different shapes, i.e. spheres, cylinders, or lamellae, or in the form of mesoporous materials. The preferred nanostructured composite material is a nanostructured non-oxide ceramic material including, but not limited to, a high temperature SiCN or SiC material. Although the invention is preferably directed to nanostructured composite materials, the process of the invention can also be used to prepare macroscopically oriented samples and mesoporous solids.

The block copolymer used as the structure directing agent must have at least one polymer block chemically compatible with the PDC precursor and at least one other block chemically incompatible with the PDC precursor to achieve microphase separation and nanostructured composite materials. The chemical incomparability between the PDC precursor and one of the blocks of the block copolymer can be due to polar-apolar repulsion (e.g., hydrophobic-hydrophilic repulsion) or any other repulsive interaction. Other interactions resulting in microphase separation could, e.g., be achieved through hydrogen bonding or metal coordination between the PDC precursor and one of the blocks of the block copolymer. The preferred block copolymer is based on polar-apolar interactions composed of at least two blocks where one block is polar in nature and one block is apolar in nature. The preferred block copolymers have A-B, A-B-A or B-A-B structures, where A is the apolar block and B is the polar block. Preference is given to the use of block copolymers which have a weight ratio of apolar blocks to polar blocks from 95:5 to 5:95. The weight ratio of the individual blocks affects the structure of the mesophase of the block copolymer and the structure of the nanostructured composite materials. It should be noted that non-amphiphilic block copolymers could be used as long as one block is molecularly compatible with the PDC precursor and the other is not.

Additionally, block copolymers frequently have a further structural unit linking the different blocks to one another. Other block copolymers preferably used for forming the mesophase therefore have the structure A-C-B, A-C-B-C-A or B-C-A-C-B, where A is an apolar block, B is a polar block and C is a low- or high-molecular weight structural unit of different polarity. C is frequently a coupling molecule or a coupling group linking the individual blocks to one another. A coupling molecule of this type may be used to form a block copolymer by linking a PDC compatible polymer block to a PDC incompatible polymer block. It is also possible to begin by polymerizing one of the two blocks, e.g., the PDC compatible block, and then attaching to this block a coupling molecule or a coupling group in order to modify the reactivity of the polymerized block with respect to the monomers, for example by changing the basicity, and then to continue the polymerization with another monomer, e.g. with a PDC incompatible monomer.

Besides diblock copolymers (i.e. block copolymer which essentially comprise two different monomers) it is also possible to use triblock copolymers (i.e. block copolymers essentially comprising three different monomers) or higher block copolymers (i.e. those having more than three different monomers).

Examples of preferred apolar polymers which may be used as an apolar block in the preferred block copolymer are polyisoprene, polybutadiene, polydimethyl-siloxane, methylphenylsiloxane, polyacrylates of $C_1$–$C_4$ alcohols, polymethacrylates of $C_3$–$C_4$ alcohols, and hydrogenated polyisoprene and/or polybutadiene as long as these hydrogenated polymers are not in crystalline form. Particular preference is given to using polyisoprene as the apolar block.

Examples of preferred polar polymers which may be used as a polar block in the preferred block copolymer are polyethylene oxide, polyvinyl alcohols, polyvinylamines, polyvinylpyridines, polyacrylic acids, polymethacrylic acids, hydrophilic polyacrylates and amides, hydrophilic polymethacrylates and amides, and polystyrenesulfonic acids. In the preferred application whereby Ceraset is used as the PDC precursor, the polar block is preferably composed of polyethylene oxide.

The preferred block copolymer is a poly(isoprene-block-ethylene oxide), PI-b-PEO, a block copolymer with the PI block being very apolar in character and the PEO block possessing polar character. However, it is understood that other block copolymers may be used as the structure directing agents, including, but not limited to, polystyrene-block-ethylene oxide or polystyrene-block-vinyl pyridine or various block copolymers containing a block of polyisoprene.

Block copolymers with only one PDC compatible block may be prepared by any known prior art polymerization process including, but not limited to, cationic, free-radical or anionic polymerization. The anionic polymerization of polar/apolar block copolymers is described, for example, by J. Allgaier et al., Macromolecules 30 (1997), 1582 and in DE-A-2,322,079.

Using block copolymers, it is further possible to obtain microstructures whose order of size is within the characteristic range of length of the polymer chains, i.e. within a size range of from 5 to 100 nanometers. The range of lengths of the nanostructured composite material may be adjusted directly via the molecular weight of the block copolymer used. Preference is given to the use of block copolymers whose molecular weight is from 1000 to 1,000,000 dalton. The molecular weight is selected as a function of the desired size of the nanostructured composite material. Preference is given to the use of a block copolymer whose polydispersity, $M_w/M_n$, is low. The polydispersity is preferably from 1.0 to 1.5. Using a low polydispersity block copolymer can give advantageously high uniformity in the size of the nanostructured composite material.

Nanostructured composite materials are formed by mixing the PDC precursor, preferably a silazane, most preferably Ceraset, with the block copolymer leading to segregation of the PDC precursor within one block of the block copolymer primarily due to preferred molecular interactions. The block copolymer is preferably mixed with the PDC precursor at $\geq 50°$ C., particular preferably from 50 to 70° C., and most preferably at about 50° C. However, the mixing may also take place at lower temperatures, e.g. room temperature. The composition and structure of the nanostructured composite material may be determined via the weight ratio of block copolymer to PDC precursor. The weight ratio of block copolymer to PDC precursor is preferably from 5:95 to 95:5. The structure of the nanostructured composite material depends on the ratio between the amount of the block copolymer and the amount of the PDC precursor which becomes concentrated in one of the blocks of the block copolymer. The respective structure can be estimated from known phase diagrams of block copolymers and their mixture with homopolymers. The present method is similar to blending block copolymers with homopolymers or solvents chemically selective to one of the copolymer blocks. By taking a block copolymer with a fixed fraction of one block with respect to the other, different morphologies are accessible by simply varying the amount of the PDC precursor, in this case, the silazane, added to the block copolymer. After cooperative self-assembly of the block copolymer and the PDC precursor, nanostructured composite materials can be permanently set in the preferred morphology by crosslinking or polymerizing the PDC precursor. Preferably, the nanostructured composite material is crosslinked using radical initiation. The preferred radical initiation includes the addition of a radical initiator, preferably dicumyl peroxide. The preferred radical initiation using dicumyl peroxide occurs at a preferred temperature of 120° C. Although the preferred radical initiator is dicumyl peroxide, UV-light activation may be used to perform the crosslinking step at any temperature.

For example, as shown in FIG. 1, starting with a preferred block copolymer, PI-b-PEO, with a small PEO volume fraction exhibiting a body-centered cubic, BCC, sphere morphology, i.e. PEO spheres in a PI matrix, increasing the amount of the silazane added to the block copolymer is expected to effectively increase the volume fraction of the PEO domains. As shown in FIG. 1, this would push the morphology toward a lamellar morphology, in accordance with the phase diagram for PI-b-PEO. Polymerization of the silazane could then be initiated through a thermally activated radical initiator, preferably dicumyl peroxide, within the PEO domains generating a nanostructured composite material comprising primarily two phases, polyisoprene and a polyethylene oxide/crosslinked polysilazane mixed phase.

The block copolymer is preferably mixed with a solvent to form a reaction mixture prior to reaction with the PDC precursor. Preferably, the solvent is one in which the block copolymer is soluble, for example, a chlorinated hydrocarbon or a linear or cyclic ether, in particular chloroform, tetrahydrofuran or mixtures thereof. It is also preferable for the PDC precursor to have at least some solubility in the solvent used. In this particular preferred method of conducting the process, the solvent serves merely for mixing of the PDC precursor and the block copolymer.

Preferably, the block copolymer material is removed from the nanostructured composite material after formation. This is preferably done by calcining away the block polymer by heating the nanostructure composite material to temperatures greater than 550° C. Higher heat treatment temperatures of nanostructured non-oxide ceramic materials results in higher conversion of the PDC to ceramic content.

EXPERIMENTAL DATA

Materials

The block copolymer used herein is poly(isoprene-block-ethylene oxide), PI-b-PEO, synthesized using anionic polymerization. The resulting block copolymers were monodisperse with polydispersity indices, $M_w/M_n$, below 1.1. Two block copolymers of different molecular weight were used: P1 with a molecular weight of 16,100 g/mol and 19.2 wt % PEO and P2 with a molecular weight of 29,300 g/mol and 17.2 wt % PEO. The physical characteristics of the block copolymers were determined by gel-permeation chromatography, GPC and H1-NMR. Ceraset (KiON Corp.) and the radical initiator, dicumyl peroxide (Aldrich), were used as received. In a typical synthesis, a 5 wt % block copolymer solution of tetrahydrofuran was mixed with the radical initiator (2 wt % with respect to the mass of Ceraset added) and the silazane, herein Ceraset, (50 wt % with respect to the block copolymer), and stirred for one hour. The resulting solution was poured into a Petridish and a film cast on a hot plate at 50° C. for three hours. The film was then annealed in a vacuum oven for 24 hours at 50° C. and subsequently ramped up to 120° C. for one hour to crosslink the silazane. Two block copolymer-polysilazane nanostructured composite materials were derived from P1 and P2, through addition of 50 wt % Ceraset and were designated as P1C1 and P2C1, respectively.

Materials Characterization

The block copolymer-polysilazane nanostructured composite materials were characterized by small angle X-ray scattering, SAXS, and transmission electron microscopy, TEM. The SAXS experiments were performed on a Bruker-AXS Nanostar (Cu Kα, 1.54 Å) operated at 40 KV, 40 mA in transmission mode. Ultrathin TEM samples were sectioned with a Leica Ultracut UCT microtome at 300K and mounted on a copper grid. Bright field TEM micrographs were taken on a JEOL 1200EX operating at 120 KV.

Results

Figure 2:
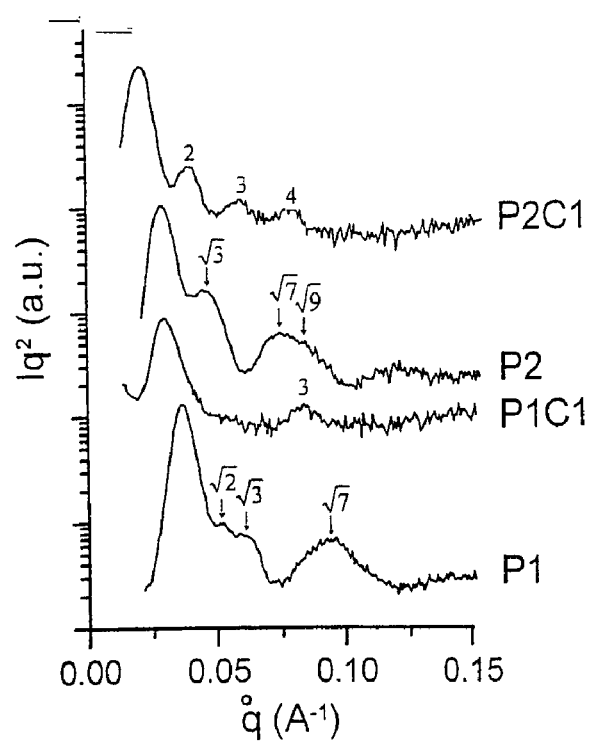
FIG. 2 shows SAXS traces of the block copolymers P1 and P2 as well as the corresponding nanostructured composite materials derived from them, P1C1 and P2C1, after a 120° C. heat treatment, traces were vertically shifted for clarity.

The microdomain structure of the two block copolymers used herein was explored by small-angle x-ray scattering, SAXS, and are shown in FIG. 2. A representative SAXS pattern obtained for P1 at room temperature shows peak positions at q*, √2q*, √3q*, and √7q*, where q* is the value of the scattering wave vector, q, at the maximum of the first order reflection. This pattern is characteristic for spheres packed in a body-centered cubic, BCC, lattice with PEO spheres in a matrix of PI, as expected for this volume fraction. A representative SAXS pattern obtained for P2 at room temperature shows peak positions at q*, √3q*, √7q*, and √9q*. This spacing sequence is indicative of a hexagonal array of PEO cylinders in a PI matrix.

After synthesis of the nanostructured composite material using 50 wt % Ceraset and the two block copolymers, P1 and P2, and vacuum annealing at 120° C., the resulting nanostructured composite materials, P1C1 and P2C1, were again characterized by SAXS. The patterns are shown in FIG. 2 directly above their respective block copolymer traces. In both cases higher order peaks can be observed demonstrating successful nanostructure formation. Furthermore, corresponding block copolymer and nanostructured composite material scattering traces are considerably different. The first order reflections are shifted to lower q-values and the sequence of higher order reflections is now 3q* for P1C1, and 2q*, 3q*, and 4q* for P2C1. These sequences are characteristic for a lamellar morphology, suggesting that the addition of Ceraset to PI-b-PEO has selectively swollen one block, PEO, over the other, PI, and thus has induced a phase transition into the lamellar phase, consistent with the above discussion.

The spacing between the (001), (01), and (1) planes for the sphere, cylinder, and lamellar morphologies, respectively, can be calculated from q* by the relation, d-spacing=$2\pi/q^*$. The d-spacing for P1 and P2 was calculated to be 17.3 nm, and 22.0 nm, respectively. With the addition of Ceraset, the spacing is increased significantly to 21.5 nm and 30.4 nm for P1C1 and P2C1, respectively. This corresponds to a 19.5% increase from P1 to P1C1 and a 27.6% increase from P2 to P2C1. This increase in d-spacing is also accompanied by a transformation of the mesostructure. In both cases, the addition of 50 wt % Ceraset sufficiently perturbs the matrix from the original mesophase of each block copolymer to the lamellar morphology with alternating domains of PI and the PEO-Ceraset mixture.

Figure 3:
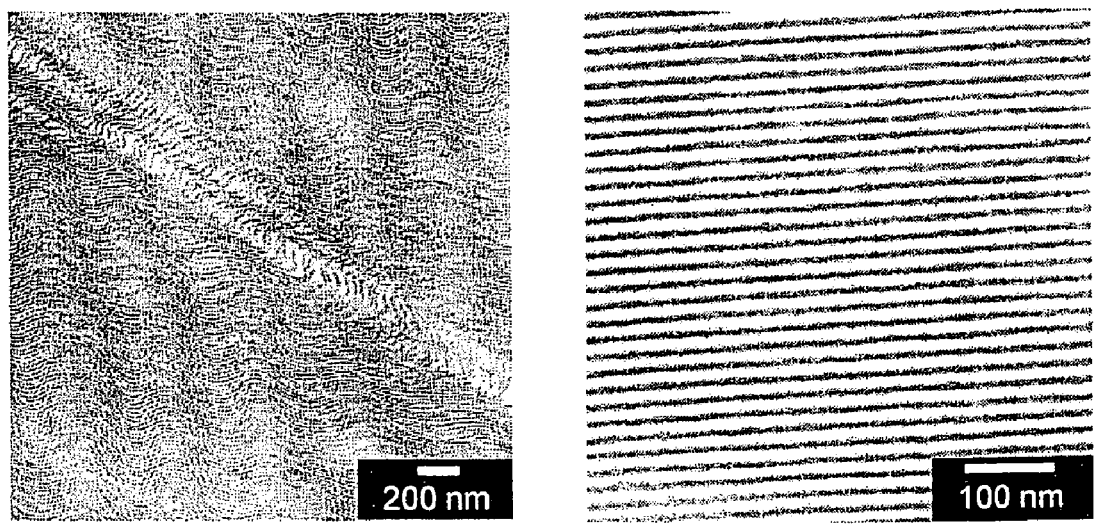
FIG. 3 shows TEM micrographs of P1C1 at two different magnifications corroborating the structural assignment to a lamellar morphology.

In order to corroborate the structural assignments, the local structure and ordering of the nanostructured composite materials were characterized with transmission electron microscopy, TEM. Representative micrographs obtained from sample P1C1 at two different magnifications are shown in FIG. 3. These micrographs clearly support the assignment to a lamellar morphology. From the micrographs, the d-spacing between lamellae was measured to be 21.1 nm, which is in good agreement with the value 21.5 nm calculated from SAXS. Since these micrographs were taken without staining the material, the results suggest the existence of two distinct microdomains: polyisoprene (light areas) and the more electron dense PEO-Ceraset mixture (dark areas).

Conclusions

It has been shown that blending a silazane based SiCN ceramic precursor, preferably Ceraset, with a block copolymer, preferably PI-b-PEO, and subsequent crosslinking of the silazane using a free radical initiator at 120° C., successfully generates a nanostructured composite material with well-defined lamellar morphology. Structural parameters like the repeat distance of the lamellar structure have been varied using two block copolymers of different architecture and molecular weight. The versatility of the preferred block copolymers, such as poly(isoprene-block-ethylene oxide), as structure directing agents has been demonstrated for various ceramic or ceramic precursor materials. While in the past unprecedented structural control on the nanoscale level has been demonstrated for sol-gel derived silica-type materials, the present invention illustrates that a similar approach can be extended to structure non-oxide ceramic materials, such as high temperature SiCN or SiC materials.

Varying the fraction of Ceraset to block copolymer in any ratio from 95:5 to 5:95 should result in the formation of other mesophases seen in similar block copolymer-ceramic systems. Besides the lamellar morphology these would include the sphere, hexagonal cylinder, and cubic bicontinuous structures as well as the inverse morphologies of those mesophases.

Although the present invention has been disclosed in terms of a preferred embodiment, it will be understood that numerous additional modifications and variations could be made thereto without departing from the scope of the invention as defined by the following claims:

What is claimed is:

1. A method for producing a nanostructured composite material comprising,
    a) providing a polymer derived ceramic (PDC) precursor;
    b) providing a block copolymer having a block that is molecularly compatible with said PDC precursor;
    c) mixing said block copolymer and said PDC precursor;
    d) polymerizing said PDC precursor to form said nanostructured composite material; and
    e) calcining said nanostructured composite material to form a nanostructured non-oxide ceramic material.

2. The method of claim 1, whereby said block copolymer is a block copolymer including an apolar block and a polar block.

3. The method of claim 2, whereby said apolar block is selected from the group comprising polyisoprene, polybutadiene, polydimethylsiloxane, methylphenylsiloxane, polyacrylates of $C_1$–$C_4$ alcohols, polymethacrylates of $C_3$–$C_4$ alcohols, hydrogenated polyisoprene, and hydrogenated polybutadiene.

4. The method of claim 2, whereby said polar block is selected from the group comprising polyethylene oxide, polyvinyl alcohols, polyvinylamines, polyvinylpyridines, polyacrylic acid, polymethacrylic acid, hydrophilic polyacrylates and amides, hydrophilic polymethacrylates and amides, and polystyrenesulfonic acids.

5. The method of claim 1, whereby said block copolymer is poly(isoprene-block-ethylene oxide).

6. The method of claim 2, whereby said PDC precursor is a silazane.

7. The method of claim 6, whereby said silazane is a ureamethylvinylsilazane.

8. The method of claim 1, whereby said PDC precursor is a silazane.

9. The method of claim 8, whereby said silazane is a ureamethylvinylsilazane.

10. The method of claim 1, whereby said block copolymer exhibits a morphology known from the phase behavior of block copolymers.

11. The method of claim 1, whereby said block copolymer is provided in a solution comprising said block copolymer and tetrahydrofuran.

12. The method of claim 1, whereby said PDC precursor is added in varying amounts with respect to said block copolymer.

13. The method of claim 1, whereby said step of polymerizing occurs using a radical initiation.

14. The method of claim 13, whereby said radical initiation includes providing a radical initiator.

15. The method of claim 14, whereby said radical initiator is dicumyl peroxide.

16. The method of claim 15, whereby said radical initiation further includes heating to a temperature of 120° C.

17. The method of claim 1, whereby said step of polymerizing includes subjecting said PDC precursor to thermal energy or UV light energy.

18. The method of claim 1, whereby said PDC precursor is a non-oxide ceramic precursor.

19. The method of claim 18, whereby said block copolymer is poly(isoprene-block-ethylene oxide).

20. The method of claim 18, whereby said PDC precursor is a silazane.

21. The method of claim 20, whereby said silazane is a ureamethylvinylsilazane.

22. The method of claim 18, whereby said nanostructured non-oxide ceramic material is a high temperature SiCN or SiC material.

* * * * *